US011735049B2

(12) United States Patent
Takagi et al.

(10) Patent No.: US 11,735,049 B2
(45) Date of Patent: Aug. 22, 2023

(54) PARK ASSIST SYSTEM

(71) Applicant: TOYOTA JIDOSHA KABUSHIKI KAISHA, Toyota (JP)

(72) Inventors: Toshihiro Takagi, Nisshin (JP); Yu Hiei, Chiryu (JP); Chenyang Wang, Toyota (JP); Motonari Obayashi, Nagakute (JP); Tsutomu Mochida, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 17/713,400

(22) Filed: Apr. 5, 2022

(65) Prior Publication Data

US 2022/0383746 A1  Dec. 1, 2022

(30) Foreign Application Priority Data

May 26, 2021 (JP) ................................. 2021-088145

(51) Int. Cl.
*G08G 1/14* (2006.01)
*B60W 50/14* (2020.01)
*B60W 30/06* (2006.01)

(52) U.S. Cl.
CPC ............. *G08G 1/143* (2013.01); *B60W 30/06* (2013.01); *B60W 50/14* (2013.01); *B60W 2050/146* (2013.01)

(58) Field of Classification Search
CPC ...... G08G 1/143; B60W 30/06; B60W 50/14; B60W 2050/146; G06V 20/586; B62D 15/0285

USPC .................. 340/932.2, 937, 988, 990, 995.1
See application file for complete search history.

(56) References Cited

U.S. PATENT DOCUMENTS

| 7,697,029 | B2* | 4/2010 | Ozaki | H04N 7/181 348/148 |
| 10,467,789 | B2* | 11/2019 | Watanabe | B60T 7/22 |
| 2020/0062242 | A1* | 2/2020 | Hayakawa | B62D 15/028 |
| 2020/0082185 | A1* | 3/2020 | Yamamoto | G06V 20/58 |

FOREIGN PATENT DOCUMENTS

JP       2020-043418 A       3/2020

\* cited by examiner

*Primary Examiner* — Anh V La
(74) *Attorney, Agent, or Firm* — Sughrue Mion, PLLC

(57) ABSTRACT

A park assist system includes a controller that executes park assist control with which a vehicle is automatically parked in a parking spot. The controller is configured to set a point at a position higher than the vehicle and across the vehicle from the parking spot as a viewpoint used to generate the parking spot image, set an angle according to a parking spot distance that is an actual distance between the vehicle and a parking spot shown by the parking spot image as a depression angle used to generate the parking spot image, generate a parking spot image by using the set viewpoint and depression angle, cause a display device to display the parking spot image, and park the vehicle with the park assist control in a parking spot set by the driver as a target parking spot by way of viewing the parking spot image.

4 Claims, 13 Drawing Sheets

FIG. 1
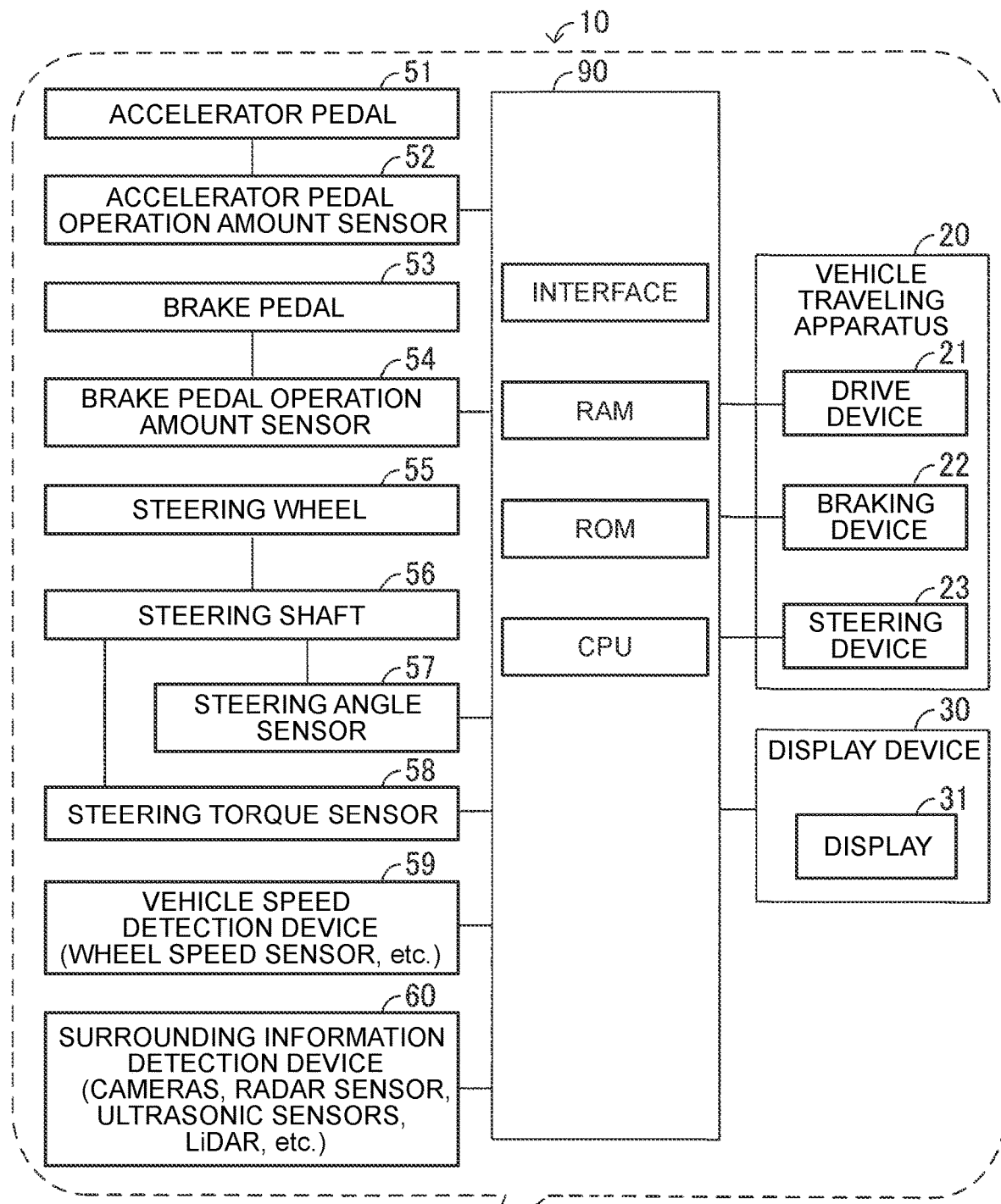
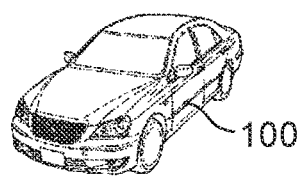

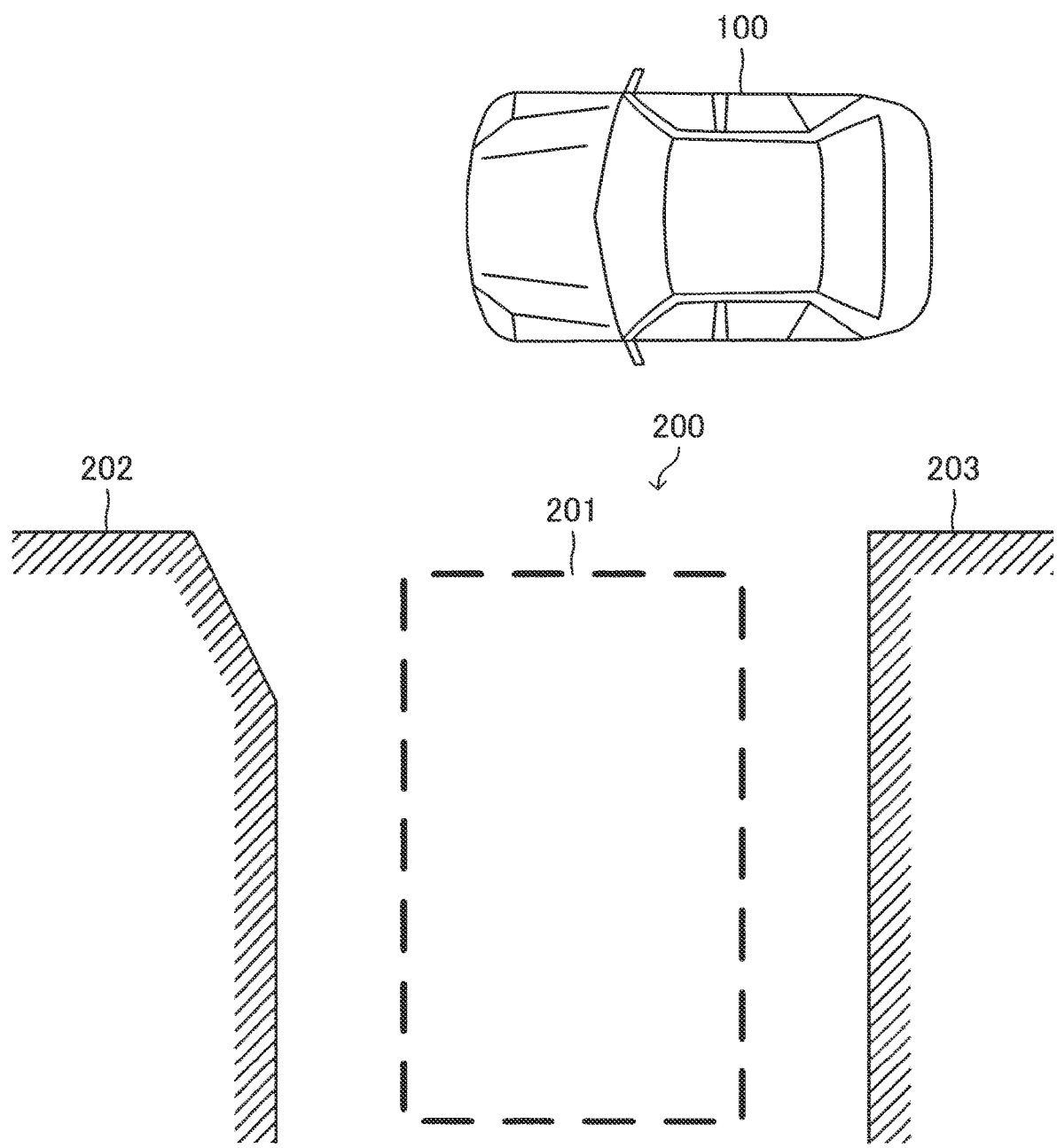

FIG. 8
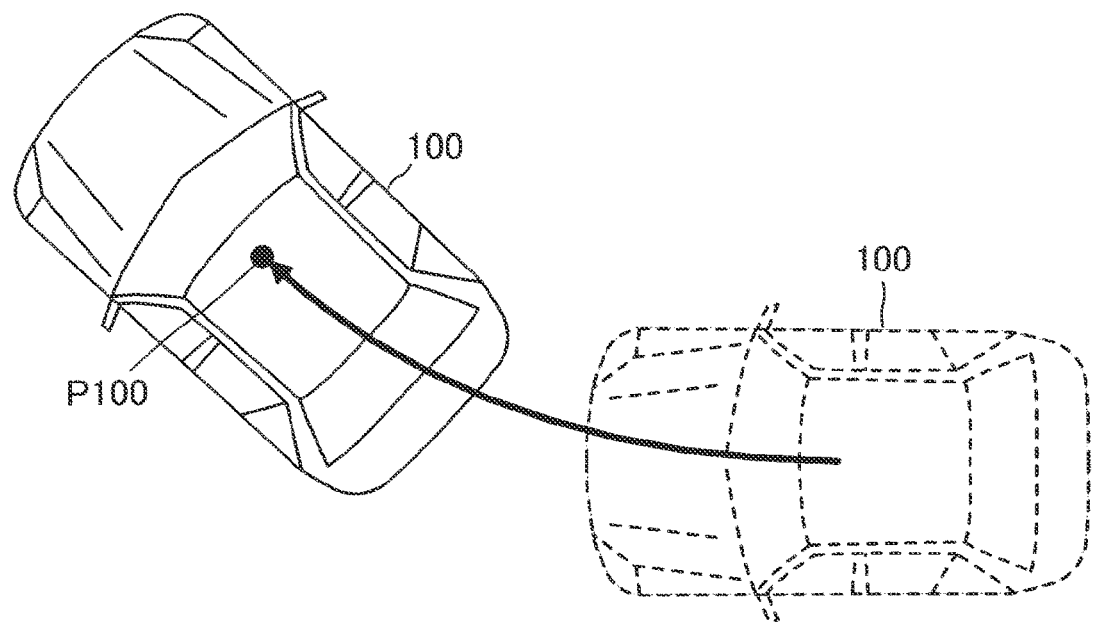
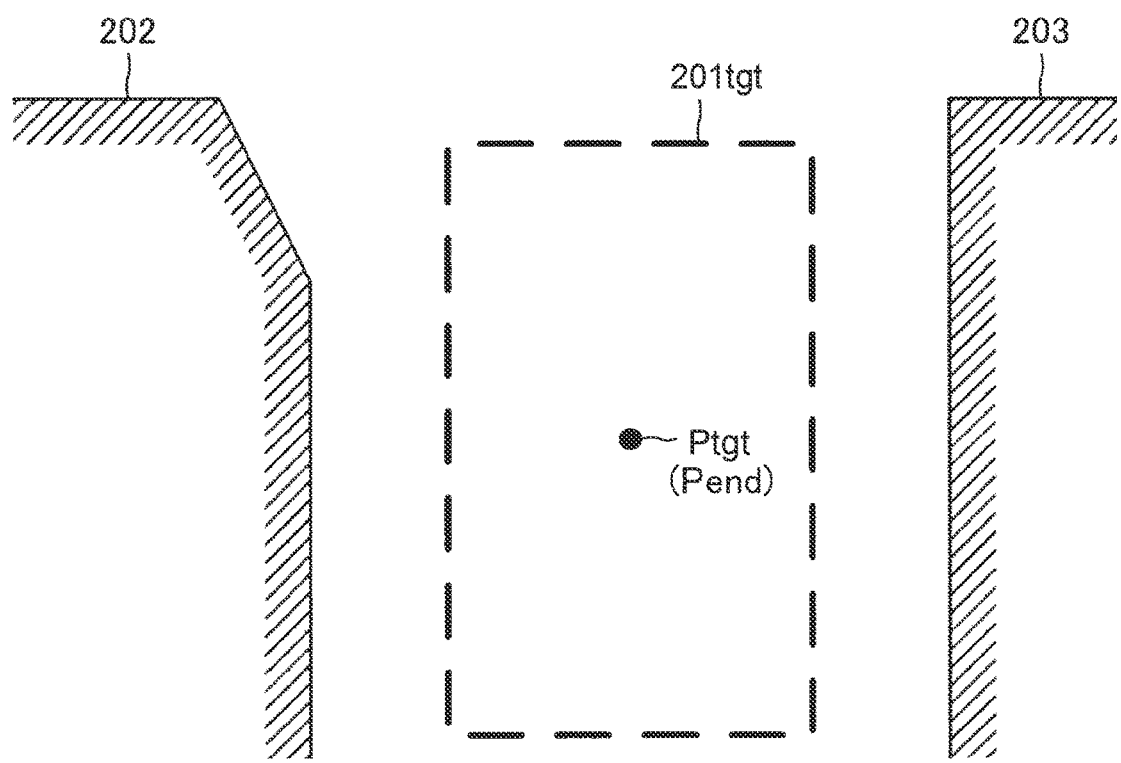

PARK ASSIST SYSTEM

CROSS-REFERENCE TO RELATED APPLICATION

This application claims priority to Japanese Patent Application No. 2021-088145 filed on May 26, 2021, incorporated herein by reference in its entirety.

BACKGROUND

1. Technical Field

The present disclosure relates to a park assist system.

2. Description of Related Art

There has been known a park assist system that executes park assist control for automatically parking a vehicle in a parking spot (see, for example, Japanese Unexamined Patent Application Publication No. 2020-043418 (JP 2020-043418 A)). As such a park assist system, there has also been known a park assist system that displays the image of a parking spot where a vehicle is able to park with park assist control on a display device, such as a display, that prompts a driver of the vehicle to view the image and set a target parking spot, and that automatically parks the vehicle in the target parking spot set by the driver with park assist control.

SUMMARY

As described above, when the driver causes the vehicle to automatically park in a parking spot with park assist control, the driver sets a target parking spot while viewing the image of the parking spot displayed on the display device. Therefore, the image of a parking spot displayed on the display device is preferably an image from which the driver is able to accurately get an actual distance (parking spot distance) between the parking spot displayed and the vehicle by viewing the image.

If the driver is not able to accurately get the parking spot distance, the driver is not able to set the parking spot at a location desired to park the vehicle as a target parking spot. As a result, when the driver intends to cause the vehicle to automatically park in a parking spot with park assist control, it is not possible to park the vehicle at a location desired by the driver.

The present disclosure provides a park assist system capable of allowing a driver to further accurately get a parking spot distance from the image of a parking spot displayed on a display device.

A park assist system according to an aspect of the present disclosure includes a controller configured to execute park assist control with which a vehicle is automatically parked in a parking spot designated by a driver of the vehicle. The park assist system according to the aspect of the present disclosure further includes a display device configured to display a parking spot image such that the driver is able to visually recognize the parking spot image. The parking spot image shows a parking spot in which the vehicle is allowed to be parked with the park assist control. The controller is configured to park the vehicle with the park assist control in a parking spot designated by the driver as a target parking spot by way of viewing the parking spot image. In the park assist system according to the aspect of the present disclosure, the controller is configured to set a point at a position higher than the vehicle and across the vehicle from the parking spot as a viewpoint used to generate the parking spot image, and set an angle according to a parking spot distance that is an actual distance between the vehicle and a parking spot shown by the parking spot image as a depression angle used to generate the parking spot image. The controller is configured to generate the parking spot image by using the viewpoint and the depression angle, cause the display device to display the generated parking spot image, and park the vehicle with the park assist control in a parking spot set by the driver as a target parking spot by way of viewing the parking spot image.

According to the aspect of the present disclosure, the driver sets a target parking spot by way of viewing a parking spot image displayed on the display device. Therefore, to make it possible to set a parking spot at a position desired by the driver to park the vehicle as a target parking spot, the parking spot image is preferably an image from which the driver is able to accurately get an actual distance (parking spot distance) between the parking spot displayed and the vehicle by viewing the image. To generate a parking spot image that allows the driver to accurately get a parking spot distance, it is effective to set a depression angle that is an element to determine the way of viewing a parking spot image according to a parking spot distance. With the aspect of the present disclosure, the depression angle is set to an angle according to a parking spot distance. Therefore, the driver is able to further accurately get the parking spot distance by viewing the parking spot image, with the result that the driver is able to set a parking spot at a position desired to park the vehicle as a target parking spot.

In the park assist system according to the aspect of the present disclosure, the controller may be configured to set the depression angle to an angle that increases as the parking spot distance extends.

Generally, a driver who views a parking spot image generated by using a large depression angle recognizes that a parking spot shown by the parking spot image is at a position far from the vehicle. With the aspect of the present disclosure, the depression angle is set to an angle that increases as the parking spot distance extends. Therefore, the driver is able to further accurately get the parking spot distance by viewing the parking spot image.

In the park assist system according to the aspect of the present disclosure, the controller may be configured to set the viewpoint to a point at a position farther from the parking spot across the vehicle as the parking spot distance extends.

Generally, when an image showing the vehicle is displayed in a parking spot image, a driver is able to further accurately get a parking spot distance by viewing the parking spot image. When the viewpoint is a point at a position farther from a parking spot across the vehicle as the parking spot distance extends, an image showing the vehicle is easily displayed in the parking spot image. With the aspect of the present disclosure, the viewpoint is set to a point at a position farther from a parking spot across the vehicle as the parking spot distance extends. Therefore, the driver is able to further accurately get the parking spot distance by viewing the parking spot image.

In the park assist system according to the aspect of the present disclosure, the controller may be configured to set the viewpoint to a point at a lower position as the parking spot distance extends.

Generally, when a parking spot distance is long, an image showing a vehicle is easily displayed in a parking spot image when the viewpoint is low. With the aspect of the present disclosure, the viewpoint is set to a point at a lower position as the parking spot distance extends. Therefore, the driver is able to further accurately get the parking spot distance by viewing the parking spot image.

Components according to the aspect of the present disclosure are not limited to those in the embodiments of the present disclosure that will be described later with reference to the accompanying drawings. Other objects, other features, and associated benefits of the present disclosure will be easily understood from the description of the embodiments of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a block diagram of a park assist system and a vehicle on which the park assist system is mounted according to an embodiment of the present disclosure;

FIG. 2 is a view of a parking spot or the like in which a vehicle is to be parked;

FIG. 3B is a view of the display showing a target setting operation screen containing a parking spot line image and the like;

FIG. 3C is a view of the display showing a target adjustment operation screen containing the parking spot line image and the like;

FIG. 8 is a view of a state where the vehicle moves forward while turning right with park assist control;

DETAILED DESCRIPTION OF EMBODIMENTS

Figure 3A:
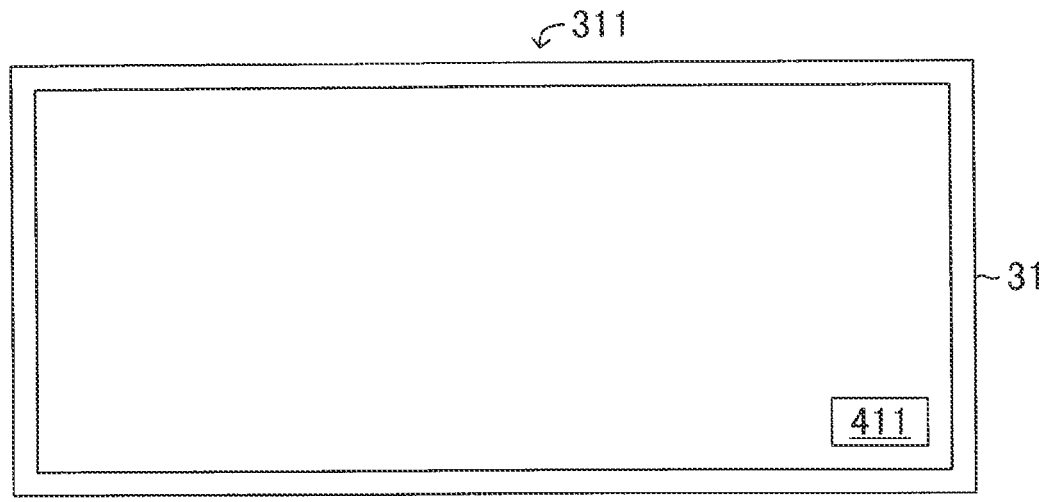
FIG. 3A is a view of a display showing a control start operation screen.

Hereinafter, a park assist system according to an embodiment of the present disclosure will be described with reference to the accompanying drawings. FIG. 1 shows a park assist system 10 and a vehicle (host vehicle 100) to which the park assist system 10 is applied according to the embodiment of the present disclosure.

ECU

The park assist system 10 includes an ECU 90 as a controller that executes various controls and processes. The term ECU is an abbreviation of electronic control unit. The ECU 90 includes a microcomputer as a main component. The microcomputer includes a CPU, a ROM, a RAM, a nonvolatile memory, an interface, and the like. The CPU is configured to implement various functions by running instructions, programs, or routines stored in the ROM.

Vehicle Traveling Apparatus

The vehicle traveling apparatus 20 is mounted on the host vehicle 100. The vehicle traveling apparatus 20 outputs a driving force for propelling the host vehicle 100, a braking force for braking the host vehicle 100, and a steering force for turning the host vehicle 100. In the present embodiment, the vehicle traveling apparatus 20 includes a drive device 21, a braking device 22, and a steering device 23.

Drive Device

The drive device 21 outputs a driving force for the host vehicle 100 to propel the host vehicle 100. The drive device 21 is, for example, an internal combustion engine, a motor, or the like. The drive device 21 is electrically connected to the ECU 90. The ECU 90 is capable of controlling a driving force output from the drive device 21 by controlling the operation of the drive device 21.

Braking Device

The braking device 22 outputs a braking force for the host vehicle 100 to brake the host vehicle 100. The braking device 22 is, for example, a brake system. The braking device 22 is electrically connected to the ECU 90. The ECU 90 is capable of controlling a braking force output from the braking device 22 by controlling the operation of the braking device 22.

Steering Device

The steering device 23 outputs a steering force for the host vehicle 100 to steer the host vehicle 100. The steering device 23 is, for example, a power steering system. The steering device 23 is electrically connected to the ECU 90. The ECU 90 is capable of controlling a steering force output from the steering device 23 by controlling the operation of the steering device 23.

Display Device

A display device 30 is further mounted on the host vehicle 100. The display device 30 displays various images and includes a display 31. In the present embodiment, the display 31 is the display of a so-called navigation system. The display device 30 is placed at a location in the host vehicle 100 where a driver is able to visually recognize the display device 30.

The display device 30 is electrically connected to the ECU 90. The ECU 90 is able to cause the display 31 of the display device 30 to display various images.

Sensors

An accelerator pedal 51, an accelerator pedal operation amount sensor 52, a brake pedal 53, a brake pedal operation amount sensor 54, a steering wheel 55, a steering shaft 56, a steering angle sensor 57, a steering torque sensor 58, a vehicle speed detection device 59, and a surrounding information detection device 60 are further mounted on the host vehicle 100.

Accelerator Pedal Operation Amount Sensor

The accelerator pedal operation amount sensor 52 detects the operation amount of the accelerator pedal 51. The accelerator pedal operation amount sensor 52 is electrically connected to the ECU 90. The accelerator pedal operation amount sensor 52 transmits information on the detected operation amount of the accelerator pedal 51 to the ECU 90. The ECU 90 acquires the operation amount of the accelerator pedal 51 as an accelerator pedal operation amount AP based on the information.

The ECU 90 acquires a required driving force (required driving torque) by computation from the accelerator pedal operation amount AP and the vehicle speed SPD of the host vehicle 100. The required driving force is a driving force required from the drive device 21 to output. The ECU 90 controls the operation of the drive device 21 such that the required driving force is output. When the ECU 90 executes park assist control (described later), the ECU 90 determines an appropriate required driving force required to propel the host vehicle 100 regardless of the accelerator pedal operation amount AP or the like and controls the operation of the drive device 21 such that the required driving force is output.

Brake Pedal Operation Amount Sensor

The brake pedal operation amount sensor 54 detects the operation amount of the brake pedal 53. The brake pedal operation amount sensor 54 is electrically connected to the ECU 90. The brake pedal operation amount sensor 54 transmits information on the detected operation amount of the brake pedal 53 to the ECU 90. The ECU 90 acquires the operation amount of the brake pedal 53 as a brake pedal operation amount BP based on the information.

The ECU 90 acquires a required braking force (required braking torque) by computation from the brake pedal operation amount BP. The required braking force is a braking force required from the braking device 22 to output. The ECU 90 controls the operation of the braking device 22 such that the required braking force is output. When the ECU 90 executes park assist control (described later), the ECU 90 determines an appropriate required braking force required to brake the host vehicle 100 regardless of the brake pedal operation amount BP or the like and controls the operation of the braking device 22 such that the required braking force is output.

Steering Angle Sensor

The steering angle sensor 57 detects the rotation angle of the steering shaft 56 with respect to a neutral position. The steering angle sensor 57 is electrically connected to the ECU 90. The steering angle sensor 57 transmits information on the detected rotation angle of the steering shaft 56 to the ECU 90. The ECU 90 acquires the rotation angle of the steering shaft 56 as a steering angle θs based on the information.

Steering Torque Sensor

The steering torque sensor 58 detects the torque input by the driver to the steering shaft 56 via the steering wheel 55. The steering torque sensor 58 is electrically connected to the ECU 90. The steering torque sensor 58 transmits information on the detected torque to the ECU 90. The ECU 90 acquires the torque input by the driver to the steering shaft 56 via the steering wheel 55 as a driver input torque TQ_D based on the information.

Vehicle Speed Detection Device

The vehicle speed detection device 59 detects the vehicle speed of the host vehicle 100. The vehicle speed detection device 59 is, for example, a wheel speed sensor. The vehicle speed detection device 59 is electrically connected to the ECU 90. The vehicle speed detection device 59 transmits information on the detected vehicle speed of the host vehicle 100 to the ECU 90. The ECU 90 acquires the vehicle speed SPD of the host vehicle 100 based on the information.

The ECU 90 acquires the torque added to the steering shaft 56 (assisted steering torque TQ_A) from the steering device 23 based on the acquired steering angle θs, driver input torque TQ_D, and vehicle speed SPD. The assisted steering torque TQ_A is added to the steering shaft 56 to assist the driver in operating the steering wheel 55. The ECU 90 controls the operation of the steering device 23 such that the assisted steering torque TQ_A is output from the steering device 23. When the ECU 90 executes park assist control (described later), the ECU 90 determines an appropriate required steering force required to steer the host vehicle 100 regardless of the steering angle θs or the like and controls the operation of the steering device 23 such that the required steering force is output.

Surrounding Information Detection Device

The surrounding information detection device 60 detects information around the host vehicle 100. The surrounding information detection device 60 is made up of, for example, cameras, a radar sensor (millimeter-wave radar or the like), ultrasonic sensors (clearance sonar), a laser radar (LiDAR), and the like.

The surrounding information detection device 60 is electrically connected to the ECU 90. The surrounding information detection device 60 transmits the detected information around the host vehicle 100 to the ECU 90. The ECU 90 is capable of recognizing an object, a partition line, and the like around the host vehicle 100 from surrounding information I_S and further acquiring a positional relationship or the like between the recognized object and the host vehicle 100. Examples of the object include a human, a wall, a pole, a bicycle, and another vehicle.

Outline of Operation of Park Assist System

Next, the outline of the operation of the park assist system 10 will be described. The park assist system 10 is configured to be capable of executing park assist control. The park assist control is to cause the host vehicle 100 to automatically travel and park in a parking spot designated by the driver without the need of operation of the accelerator pedal 51, operation of the brake pedal 53, or operation of the steering wheel 55 by the driver.

Control Start Operation Screen

As shown in FIG. 2, when the host vehicle 100 stops beside a parking lot 200 (in the example shown in FIG. 2, the parking lot 200 is present to the lefthand side of the host vehicle 100), the park assist system 10 causes the display 31 to display a control start operation screen 311 as shown in FIG. 3A. In FIG. 2, the reference numeral 202 indicates a fence adjoining the parking lot 200, and the reference numeral 203 indicates a building adjoining the parking lot 200.

The control start operation screen 311 contains a control start button image 411. The control start button image 411 corresponds to a park assist switch that is touched by the driver to cause the park assist system 10 to start park assist control.

A park assist operator operated by the driver to cause the park assist system 10 to start park assist control is mounted on the host vehicle 100. The park assist operator is made up of various buttons, various switches, and the like. The park assist operator is, for example, provided on the steering wheel of the host vehicle 100 or a lever attached to a steering column of the host vehicle 100.

When the control start button image 411 is touched, the park assist system 10 determines that a request to execute park assist control is issued and starts park assist control.

Park Assist Control

When the park assist system 10 starts park assist control, the park assist system 10 determines whether the parking lot 200 present beside the host vehicle 100 is a parking lot already registered in the park assist system 10 (registered parking lot 200reg).

When the park assist system 10 determines that the parking lot 200 present beside the host vehicle 100 is the registered parking lot 200reg, the park assist system 10 acquires an actual distance (parking spot distance D201) between the host vehicle 100 and a parking spot 201 registered in association with the registered parking spot 200reg (registered parking spot 201reg) by estimation based on the surrounding information I_S.

On the other hand, when the park assist system 10 determines that the parking lot 200 present beside the host vehicle 100 is not the registered parking lot 200reg, the park assist system 10 acquires a parking spot candidate 201can based on the surrounding information I_S. The parking spot candidate 201can is a candidate for the parking spot 201 in the parking lot 200 where the host vehicle 100 is able to be parked. The parking spot 201 is a spot in the parking lot 200 where the host vehicle 100 is able to be parked.

When the park assist system 10 acquires the parking spot candidate 201can, the park assist system 10 acquires an actual distance (parking spot distance D201) between the host vehicle 100 and the parking spot candidate 201can by estimation based on the surrounding information I_S.

Target Setting Operation Screen

Figure 3B:
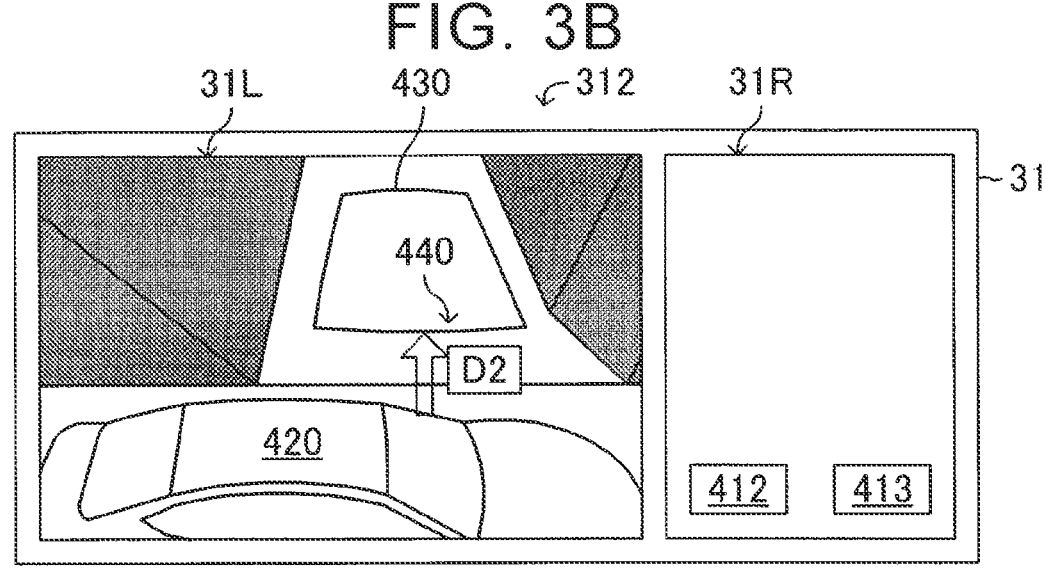

When the park assist system 10 acquires the parking spot distance D201, the park assist system 10 causes the display 31 to display a target setting operation screen 312 as shown in FIG. 3B. The target setting operation screen 312 contains a bird's eye image 420, a parking spot line image (parking spot image) 430, a distance image 440, a target adjustment button image 412, and an autonomous driving start button image 413.

The bird's eye image 420 is generated so as to show a state that would be seen when the parking lot 200 is viewed from diagonally above the host vehicle 100 (described in detail later) by combining pieces of data of images captured by the cameras of the surrounding information detection device 60 (camera image data I_C). Therefore, the bird's eye image 420 contains not only the image of the parking lot 200 but also the image of the vehicle. The image of the vehicle, shown in the bird's eye image 420, may be the image of the actual host vehicle 100; however, in the present embodiment, the image of the vehicle, shown in the bird's eye image 420, is prepared in advance as the image of the vehicle and stored in the park assist system 10.

When the parking lot 200 present beside the host vehicle 100 is the registered parking lot 200reg, the parking spot line image 430 is an image that shows the parking spot 201 registered in association with the registered parking lot 200reg (registered parking spot line image). When the parking lot 200 present beside the host vehicle 100 is not the registered parking lot 200reg, the parking spot line image 430 is an image that shows the acquired parking spot candidate 201can (parking spot candidate line image).

The distance image 440 is an image that indicates a parking spot distance D201. In the present embodiment, the distance image 440 is a combined image of an arrow image extending between the image showing the vehicle and the parking spot line image 430 with a numeric that indicates the parking spot distance D201.

The target adjustment button image 412 corresponds to a target adjustment button that is touched by the driver to show the target setting operation screen 312 for adjusting the position of the parking spot 201 (target parking spot 201tgt) where the host vehicle 100 is parked with park assist control.

The autonomous driving start button image 413 corresponds to an autonomous driving start button that is touched by the driver to set the parking spot 201 (target parking spot 201tgt) where the host vehicle 100 is parked with park assist control and to start autonomous driving of the host vehicle 100 to park the host vehicle 100 in the target parking spot 201tgt.

In the target setting operation screen 312, the bird's eye image 420 is shown in a left-side region 31L of the display 31, and the parking spot line image 430 and the distance image 440 are shown on the bird's eye image 420 in a superimposed manner. The target adjustment button image 412 and the autonomous driving start button image 413 are shown in a right-side region 31R of the display 31.

Figure 3C:
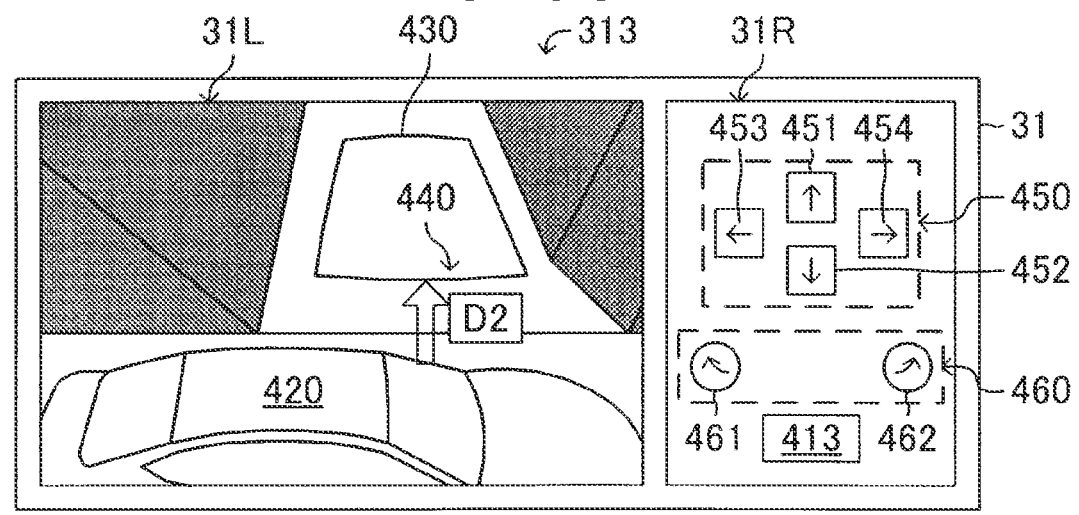

When the target adjustment button image 412 is touched, the park assist system 10 causes the display 31 to display a target adjustment operation screen 313 as shown in FIG. 3C. The target adjustment operation screen 313 contains the bird's eye image 420, the parking spot line image (parking spot image) 430, the distance image 440, a move button image 450, an angle adjustment button image 460, and the autonomous driving start button image 413.

The move button image 450 contains a move up button image 451, a move down button image 452, a move left button image 453, and a move right button image 454.

The move up button image 451 is an image that is touched by the driver to move the parking spot line image 430 upward on the display 31. The move down button image 452 is an image that is touched by the driver to move the parking spot line image 430 downward on the display 31. The move left button image 453 is an image that is touched by the driver to move the parking spot line image 430 leftward on the display 31. The move right button image 454 is an image that is touched by the driver to move the parking spot line image 430 rightward on the display 31.

The angle adjustment button image 460 contains a counterclockwise angle adjustment button image 462 and a clockwise angle adjustment button image 461.

The counterclockwise angle adjustment button image 462 is an image that is touched by the driver to rotate the parking spot line image 430 counterclockwise on the display 31. The clockwise angle adjustment button image 461 is an image that is touched by the driver to rotate the parking spot line image 430 clockwise on the display 31.

In the target adjustment operation screen 313, the bird's eye image 420 is shown in the left-side region 31L of the display 31, and the parking spot line image 430 and the distance image 440 are shown on the bird's eye image 420 in a superimposed manner. The move button image 450, the angle adjustment button image 460, and the autonomous driving start button image 413 are shown in the right-side region 31R of the display 31.

Adjustment of Position of Target Parking Spot

Before touching the autonomous driving start button image 413, the driver is able to move the parking spot line image 430 upward, downward, rightward, and leftward on the display 31 by touching the move button image 450 and is able to rotate the parking spot line image 430 counterclockwise or clockwise on the display 31 by touching the angle adjustment button image 460. The driver is able to change the position of the parking spot 201 where the host vehicle 100 is parked to a desired position by moving and rotating the parking spot line image 430 on the display 31.

Generation of Bird's Eye Image

Incidentally, when the parking spot line image 430 is superimposed on the bird's eye image 420 and displayed on the display 31, the bird's eye image 420 and the parking spot line image 430 more or less differ from those actually visually recognized by the driver. For this reason, the driver is difficult to get an actual distance between the host vehicle 100 and the parking spot 201 displayed on the display 31 only by viewing the display 31.

The target adjustment operation screen 313 is a screen for the driver to set the parking spot 201 (target parking spot 201tgt) where the host vehicle 100 is automatically parked with park assist control from this time on, and the driver adjusts the position of the parking spot line image 430 to a desired position on the display 31 by touching the move button image 450 and the angle adjustment button image 460. Therefore, the bird's eye image 420 and the parking spot line image 430 are desirably such that the driver who sees the bird's eye image 420 and the parking spot line image 430 is able to accurately get the distance between the parking spot 201 and the host vehicle 100.

The park assist system 10 causes the display 31 to display the bird's eye image 420 and the parking spot line image 430 that vary in accordance with the estimated parking spot distance D201.

Figure 4A:
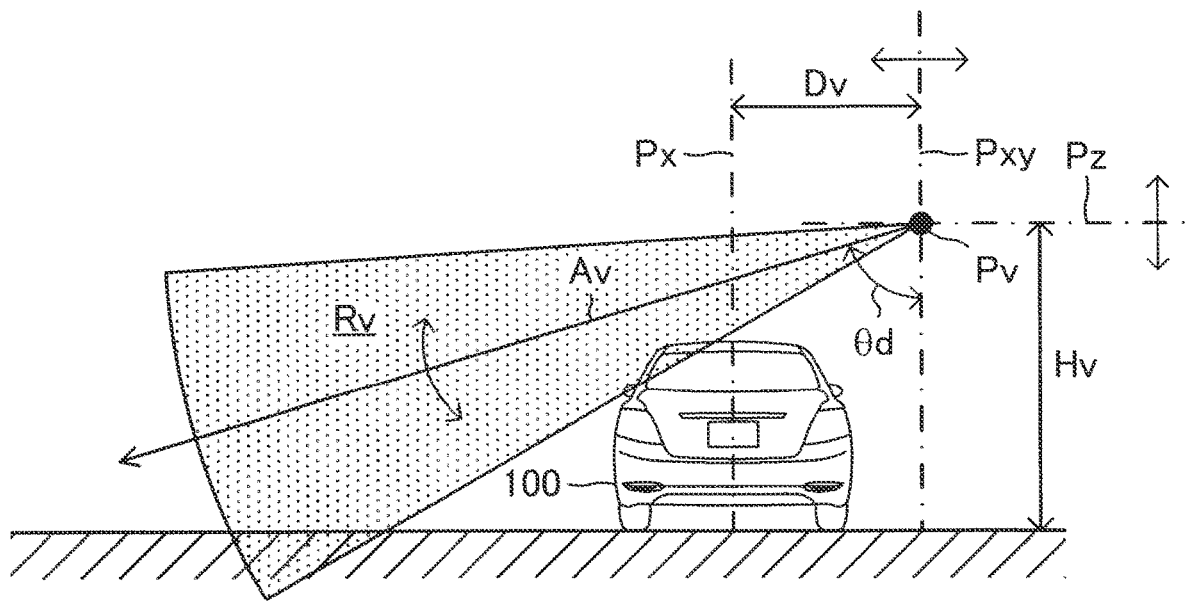
FIG. 4A is a view of a positional relationship and the like between the vehicle and a viewpoint and a depression angle used to generate a bird's eye image.
Figure 4B:
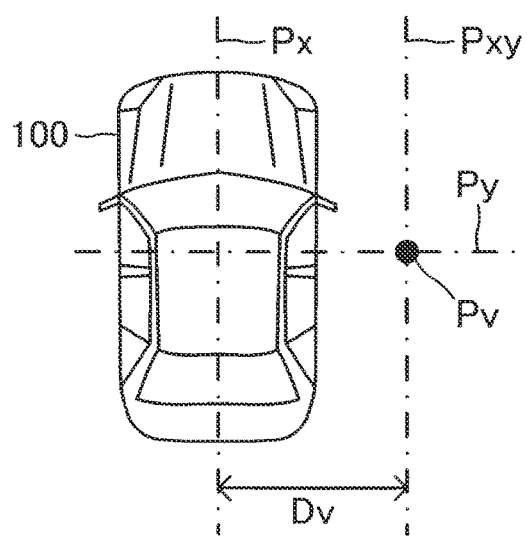
FIG. 4B is also a view of a positional relationship and the like between the vehicle and the viewpoint.

Specifically, as shown in FIG. 4A and FIG. 4B, the park assist system 10 sets a point at a position higher than the host vehicle 100 and across the host vehicle 100 from the parking spot 201 as a viewpoint Pv used to generate the bird's eye image 420. In the present embodiment, the viewpoint Pv is an intersection point of a vertical plane Py, a vertical plane Pxy, and a horizontal plane Pz.

The vertical plane Py is a plane that extends in a vertical direction and that bisects the host vehicle 100 into front and rear halves. The vertical plane Pxy is a plane that extends in the vertical direction with a clearance of a predetermined distance Dv from a vertical plane Px that bisects the host vehicle 100 into right and left halves to the side across the host vehicle 100 from the parking lot 200. The horizontal plane Pz is a plane that extends in a horizontal direction at a predetermined level Hv above a ground Gin the vertical direction.

The park assist system 10 generates the bird's eye image 420 and the parking spot line image 430 at the time of capturing a predetermined range Rv about a central axis that coincides with an axis (viewpoint axis Av) extending from the viewpoint Pv toward the parking lot 200 at a predetermined depression angle θd with respect to the vertical plane Pxy based on the camera image data I_C and the like.

The park assist system 10 sets an angle according to the parking spot distance D201 as the depression angle θd used to generate the bird's eye image 420. More specifically, the park assist system 10 sets the depression angle θd to an angle that increases as the parking spot distance D201 extends.

The park assist system 10 sets the depression angle θd to an angle that increases as the parking spot distance D201 extends and sets the viewpoint Pv to a point farther from the parking spot 201 across the host vehicle 100 as the parking spot distance D201 extends (that is, a point at which the predetermined distance Dv is long). Instead of or in addition to this, the park assist system 10 may be configured to set the viewpoint Pv to a point at a lower position as the parking spot distance D201 extends (that is, a point at which the predetermined level Hv is low).

The park assist system 10 generates the bird's eye image 420 by using the set viewpoint Pv and depression angle θd.

Figure 5A:
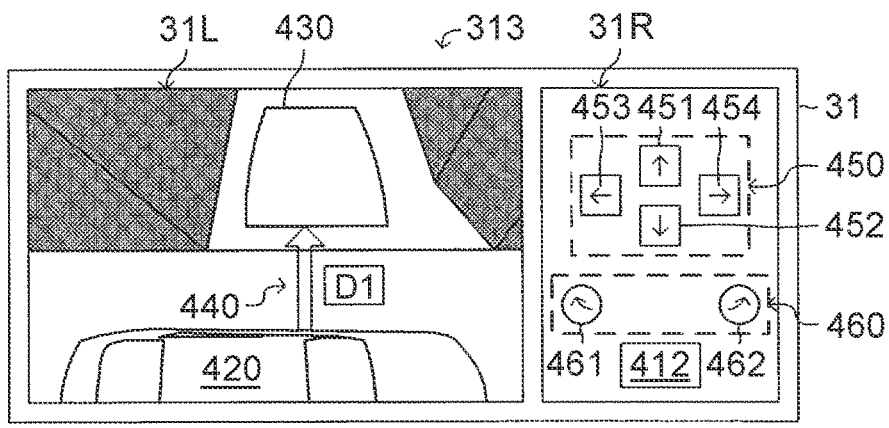
FIG. 5A is a view of the display showing a target setting operation screen at the time when the distance from the vehicle to a parking spot is a first distance.

When, for example, the parking spot distance D201 is a certain distance (first distance D1), the park assist system 10 sets the depression angle θd to an angle corresponding to the first distance D1 (first angle θ1) and generates the bird's eye image 420 and the parking spot line image 430. In this case, the display 31 displays the screen shown in FIG. 5A.

Figure 5B:
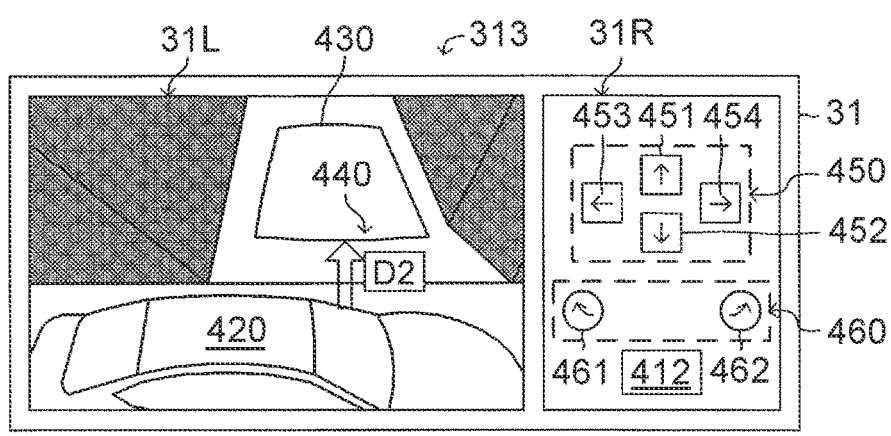
FIG. 5B is a view of the display showing the target setting operation screen at the time when the distance from the vehicle to the parking spot is a second distance.

When the parking spot distance D201 is a distance longer than the first distance D1 (second distance D2), the park assist system 10 sets the depression angle θd to an angle corresponding to the second distance D2 (second angle θ2) and generates the bird's eye image 420 and the parking spot line image 430. In this case, the display 31 displays the screen shown in FIG. 5B.

Figure 5C:
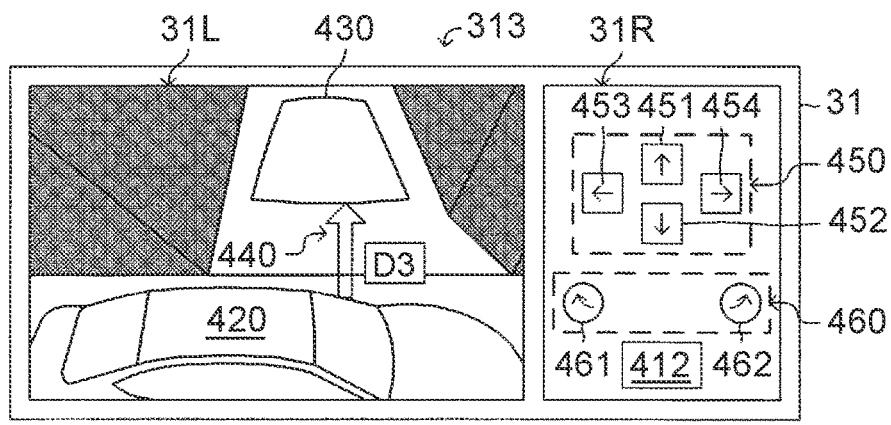
FIG. 5C is a view of the display showing the target setting operation screen at the time when the distance from the vehicle to the parking spot is a third distance.

When the parking spot distance D201 is a distance longer than the second distance D2 (third distance D3), the park assist system 10 sets the depression angle θd to an angle corresponding to the third distance D3 (third angle θ3) and generates the bird's eye image 420 and the parking spot line image 430. In this case, the display 31 displays the screen shown in FIG. 5C.

Figure 5D:
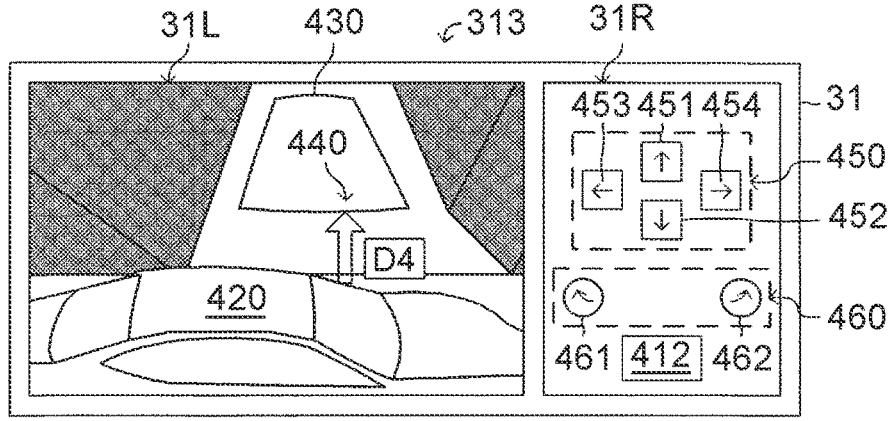
FIG. 5D is a view of the display showing the target setting operation screen at the time when the distance from the vehicle to the parking spot is a fourth distance.

When the parking spot distance D201 is a distance longer than the third distance D3 (fourth distance D4), the park assist system 10 sets the depression angle θd to an angle corresponding to the fourth distance D4 (fourth angle θ4) and generates the bird's eye image 420 and the parking spot line image 430. In this case, the display 31 displays the screen shown in FIG. 5D.

Setting of Target Parking Spot

When the autonomous driving start button image 413 is touched, the park assist system 10 sets the target parking spot 201tgt to the parking spot 201 corresponding to the position of the parking spot line image 430 at that point in time on the display 31.

Setting of Target Travel Route

Figure 6:
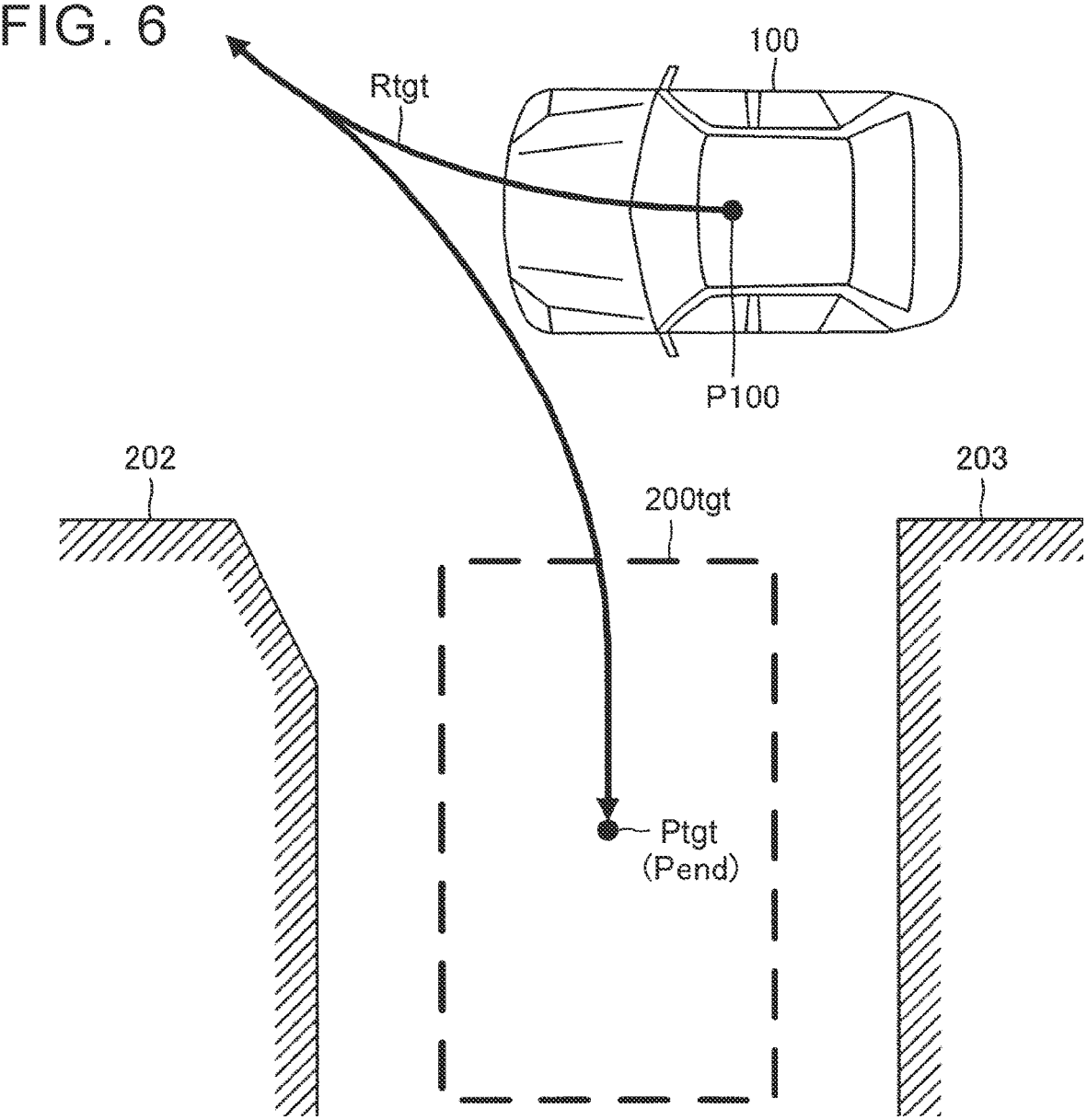
FIG. 6 is a view of a target travel route.

When the park assist system 10 sets the target parking spot 201tgt, the park assist system 10 sets a travel route (target travel route Rtgt) of the host vehicle 100 for parking the host vehicle 100 in the target parking spot 201tgt based on the surrounding information I_S as shown in FIG. 6. In the present embodiment, the endpoint of the target travel route Rtgt is a central position Ptgt of the target parking spot 201tgt (parking end position Pend).

Autonomous Driving Screen

Figure 7:
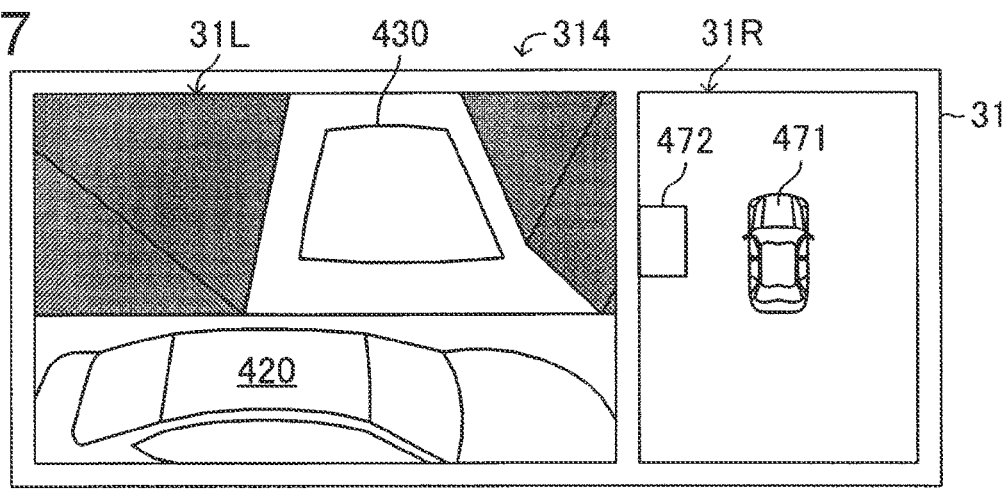
FIG. 7 is a view of the display showing an autonomous driving screen.

When the autonomous driving start button image 413 is touched, the park assist system 10 causes the display 31 to display an autonomous driving screen 314 as shown in FIG. 7 and starts autonomous driving of the host vehicle 100. The autonomous driving screen 314 contains the bird's eye image 420, the parking spot line image 430, a vehicle plan view image 471, and a target parking spot plan view image 472.

The vehicle plan view image 471 is an image that shows the host vehicle 100 when the host vehicle 100 is viewed from above in the vertical direction. The target parking spot plan view image 472 is an image that shows the target parking spot 201tgt when the area around the host vehicle 100 is viewed from above in the vertical direction.

In the autonomous driving screen 314, the bird's eye image 420 is shown in the left-side region 31L of the display 31, and the parking spot line image 430 is shown on the bird's eye image 420 in a superimposed manner. The vehicle plan view image 471 and the target parking spot plan view image 472 are shown in the right-side region 31R of the display 31. When the target parking spot 201tgt is present on the left side of the host vehicle 100, the target parking spot plan view image 472 is shown on the left side of the vehicle plan view image 471. When the target parking spot 201tgt is present on the right side of the host vehicle 100, the target parking spot plan view image 472 is shown on the right side of the vehicle plan view image 471.

Autonomous Driving

Figure 9:
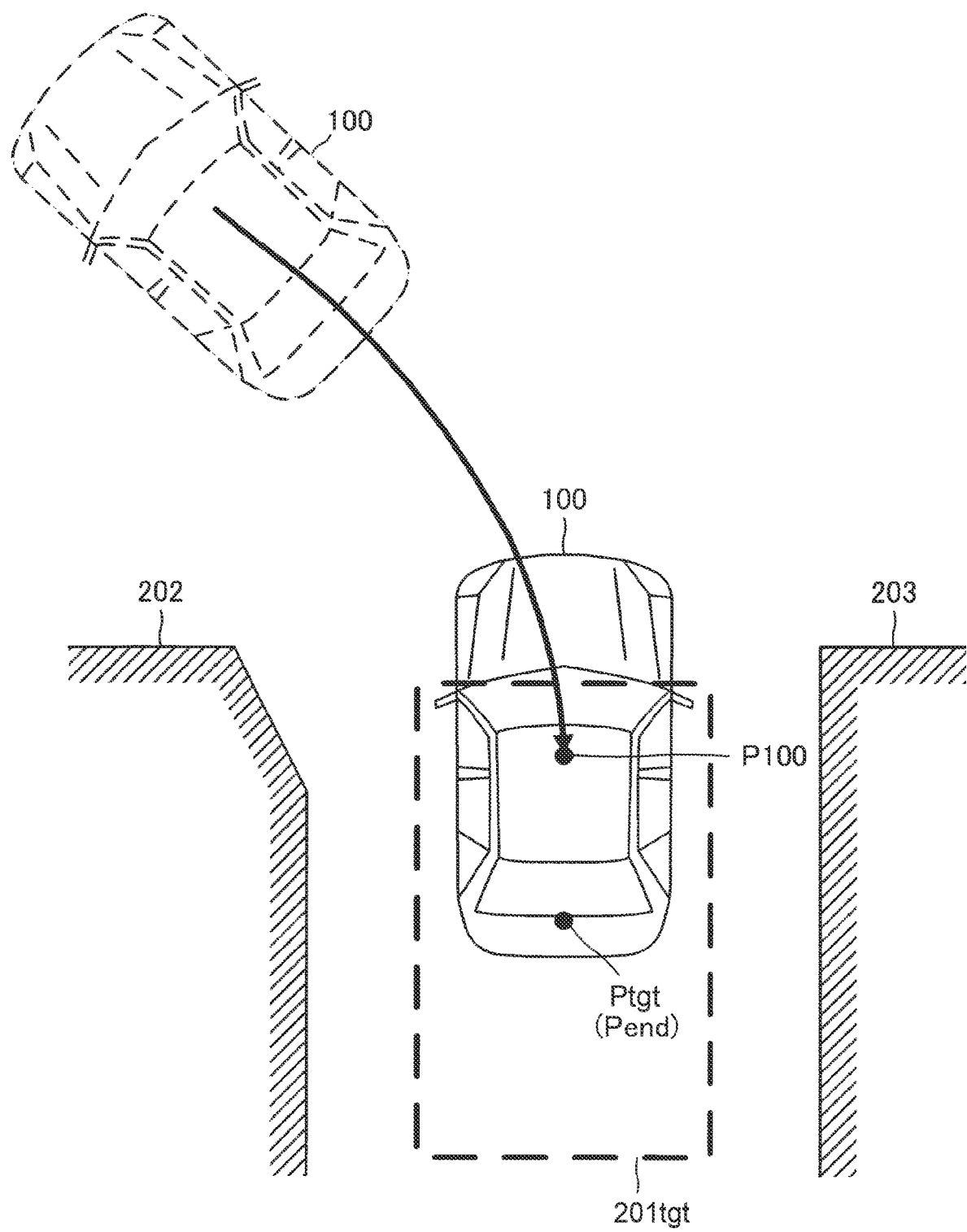
FIG. 9 is a view of a state where the vehicle is reversing while turning left with park assist control.
Figure 10:
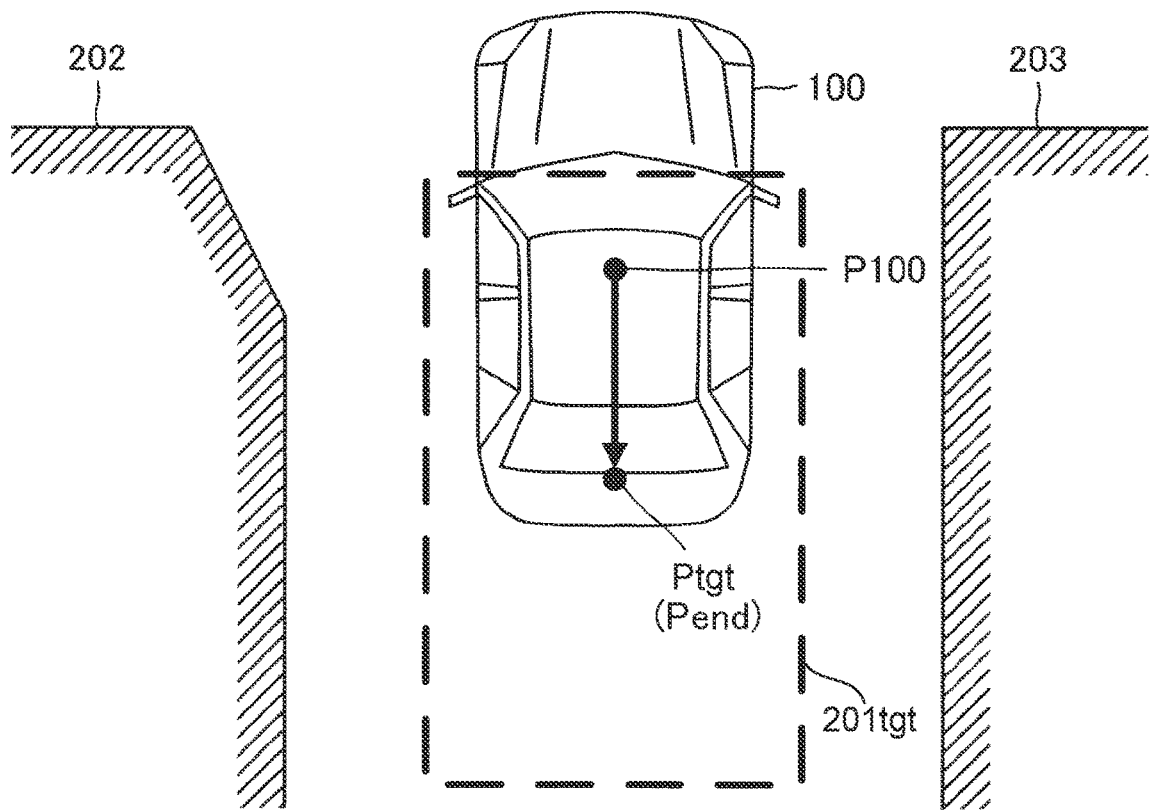
FIG. 10 is a view of a state where the vehicle is reversing in a straight line with park assist control.

When the park assist system 10 starts autonomous driving of the host vehicle 100, the park assist system 10 propels the host vehicle 100 along the target travel route Rtgt. When, for example, the target parking spot 201tgt is present on the left side of the host vehicle 100, as show in FIG. 8, the park assist system 10 initially moves the host vehicle 100 forward while turning right and causes the host vehicle 100 to stop at a point in time at which the host vehicle 100 has moved forward by a predetermined distance. Subsequently, the park assist system 10 reverses the host vehicle 100 while turning left, gradually reduces the steering angle θs, and steers the host vehicle 100 such that the steering angle θs becomes zero when the front and rear direction of the host vehicle 100 is parallel to the longitudinal direction of the target parking spot 201tgt, as shown in FIG. 9. After that, the park assist system 10 reverses the host vehicle 100 in a straight line, as shown in FIG. 10.

Figure 11:
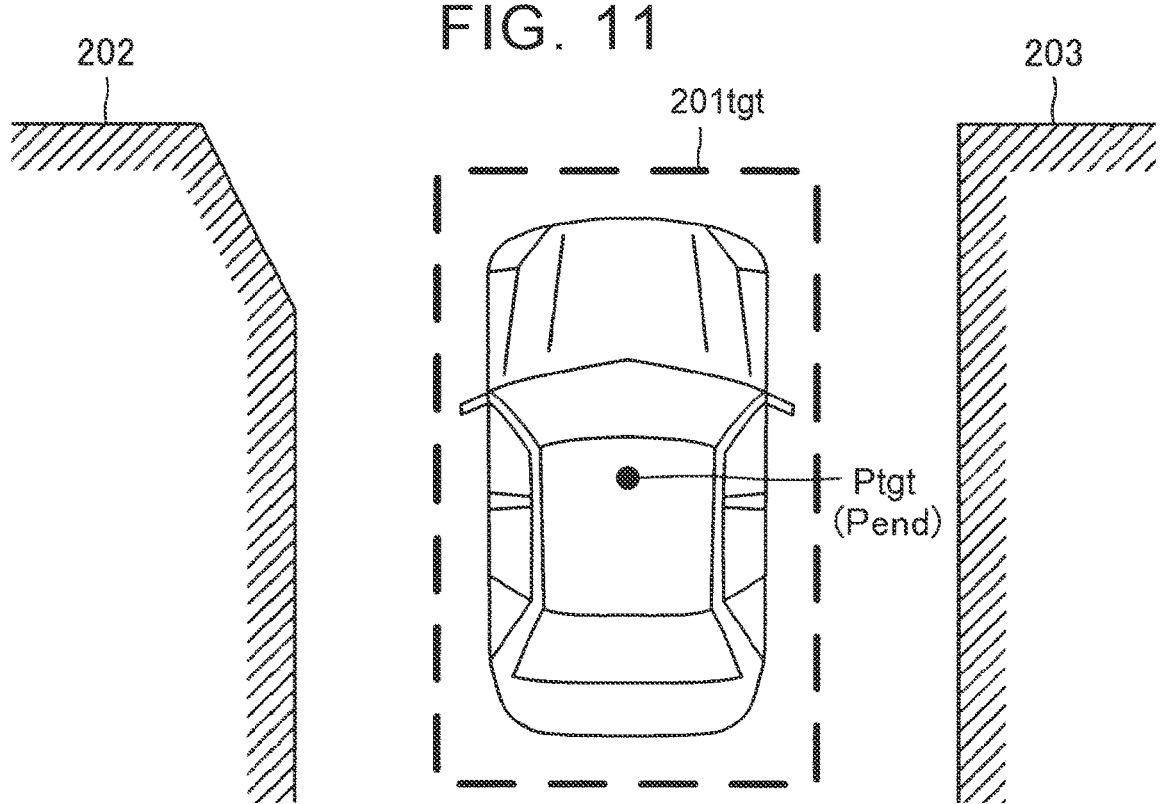
FIG. 11 is a view of a state where the vehicle reaches a parking end position.

The park assist system 10 stops the host vehicle 100 by stopping application of a driving force to the host vehicle 100 and adding a braking force to the host vehicle 100 when the central position P100 of the host vehicle 100 reaches the parking end position Pend, as shown in FIG. 11. Thus, parking of the host vehicle 100 is done.

Registration Operation Screen

Figure 12:
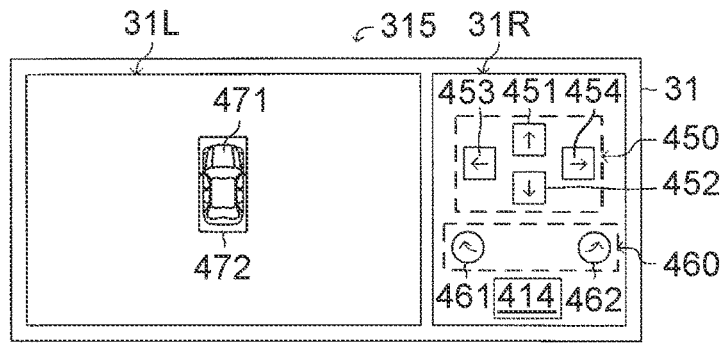
FIG. 12 is a view of the display showing a registration operation screen.

When parking of the host vehicle 100 in the target parking spot 201tgt is done, the park assist system 10 causes the display 31 to display a registration operation screen 315, as shown in FIG. 12. The registration operation screen 315 contains the vehicle plan view image 471, the target parking spot plan view image 472, a registration button image 414, the move button image 450, and the angle adjustment button image 460.

The registration button image 414 corresponds to a registration button that is touched by the driver to register the parking spot 201 where the host vehicle 100 is parked this time as the registered parking spot 201reg.

In the registration operation screen 315, the vehicle plan view image 471 and the target parking spot plan view image 472 are shown in the left-side region 31L of the display 31. The registration button image 414, the move button image 450, and the angle adjustment button image 460 are shown in the right-side region 31R of the display 31.

Adjustment of Position of Registered Parking Spot

Before touching the registration button image 414, the driver is able to move the target parking spot plan view image 472 upward, downward, rightward, and leftward on the display 31 by touching the move button image 450 and is able to rotate the target parking spot plan view image 472 counterclockwise or clockwise on the display 31 by touching the angle adjustment button image 460. The driver is able to change the position of the parking spot 201 registered to a desired position by moving and rotating the target parking spot plan view image 472 on the display 31.

Parking Lot Registration

When the registration button image 414 is touched, the park assist system 10 registers (stores or saves) information on the parking lot 200 where the host vehicle 100 is parked in the nonvolatile memory, registers (stores or saves) information on the parking spot 201 corresponding to the position of the target parking spot plan view image 472 on the display 31 at that point in time in association with the information on the parking lot 200, and ends park assist control.

Advantageous Effects

The outline of the operation of the park assist system 10 has been described above. To generate the bird's eye image 420 that allows the driver to accurately get the parking spot distance D201, it is effective to set the depression angle θd that is an element to determine the way of viewing the bird's eye image 420 according to the parking spot distance D201. With the park assist system 10, the depression angle θd is set to an angle according to the parking spot distance D201. For this reason, the driver is able to further accurately get the parking spot distance D201 by viewing the bird's eye image 420, with the result that the driver is able to set the parking spot 201 at a position desired to park the host vehicle 100 as the target parking spot 201tgt.

Park assist control executed by the park assist system 10 has been described by using the example in which the host vehicle 100 is reversed and parked in the parking spot 201 in the case where the parking spot 201 is present on the left side of the host vehicle 100. In addition, the park assist control is capable of parking the host vehicle 100 in the parking spot 201 by reversing the host vehicle 100 in the case where the parking spot 201 is present on the right side of the host vehicle 100, the park assist control is capable of parking the host vehicle 100 in the parking spot 201 by moving the host vehicle 100 forward in the case where the parking spot 201 is present on the left side of the host vehicle 100, and the park assist control is capable of parking the host vehicle 100 in the parking spot 201 by moving the host vehicle 100 forward in the case where the parking spot 201 is present on the right side of the host vehicle 100.

Furthermore, the park assist control is capable of parking the host vehicle 100 in the parking spot 201 by reversing the host vehicle 100 in the case where the parking spot 201 is present behind the host vehicle 100, and the park assist control is capable of parking the host vehicle 100 in the parking spot 201 by moving the host vehicle 100 forward in the case where the parking spot 201 is present in front of the host vehicle 100.

Furthermore, the park assist control is capable of parking the host vehicle 100 in the parking spot 201 by moving the host vehicle 100 forward in the case where the parking spot 201 is present behind the host vehicle 100, and the park assist control is capable of parking the host vehicle 100 in the parking spot 201 by reversing the host vehicle 100 in the case where the parking spot 201 is present in front of the host vehicle 100.

Specific Operation of Vehicle Park Assist System

Figure 13:
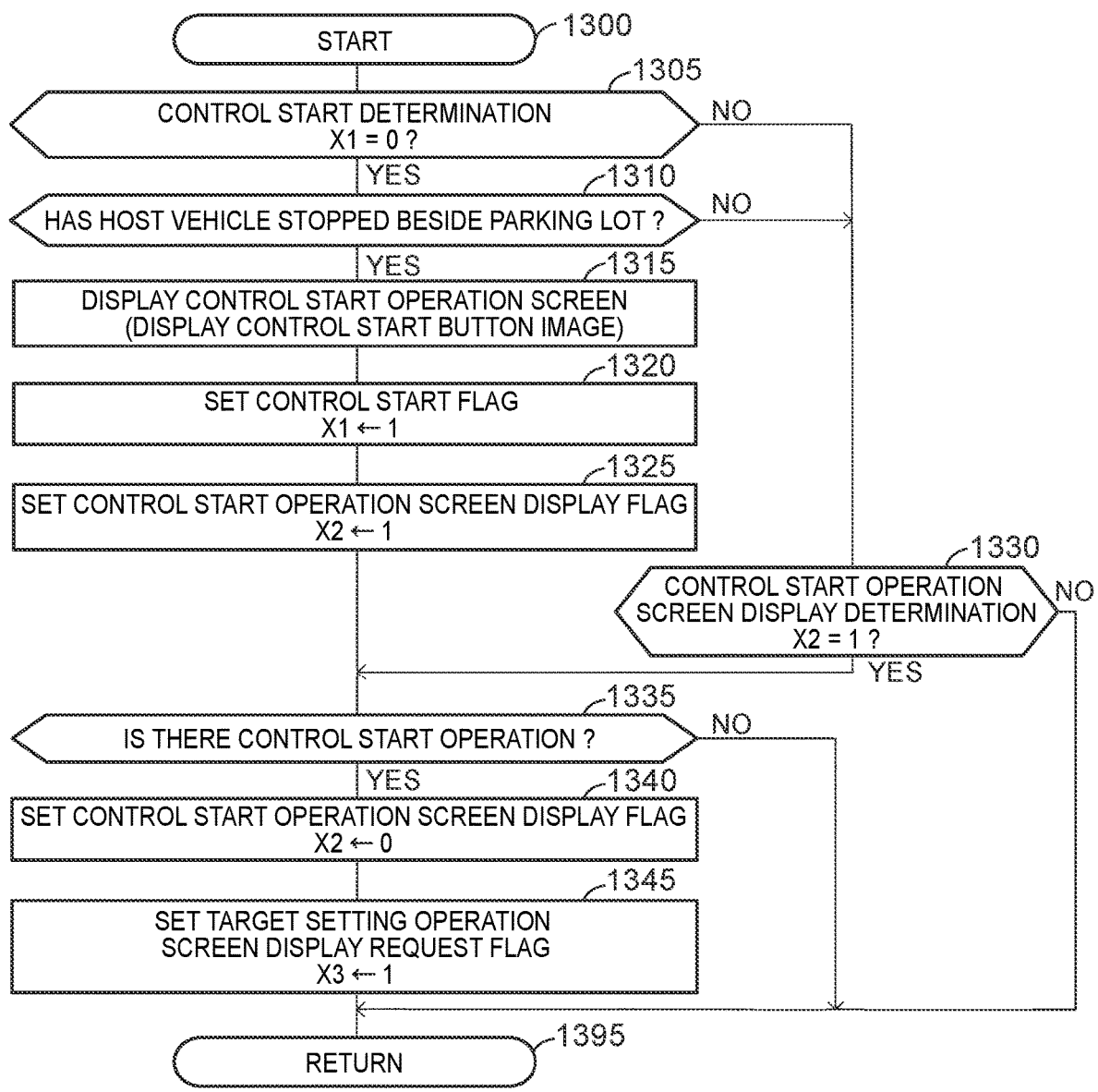
FIG. 13 is a flowchart of a routine that is executed by the park assist system according to the embodiment of the present disclosure.

Next, the specific operation of the park assist system 10 will be described. The CPU of the ECU 90 of the park assist system 10 is configured to execute the routine shown in FIG. 13 at predetermined computation intervals.

Therefore, when predetermined timing comes, the CPU starts a process from step 1300, proceeds to step 1305, and determines whether the value of a control start flag X1 is "0". The value of the control start flag X1 is set to "1" when the host vehicle 100 has stopped beside the parking lot 200, and is set to "0" when the parking lot 200 is registered in the park assist system 10.

When the CPU makes affirmative determination in step 1305, the CPU proceeds to step 1310, and determines whether the host vehicle 100 has stopped beside the parking lot 200.

When the CPU makes affirmative determination in step 1310, the CPU proceeds to step 1315, and causes the display 31 to display the control start operation screen 311. Subsequently, the CPU proceeds to step 1320, and sets the value of the control start flag X1 to "1". Subsequently, the CPU proceeds to step 1325, and sets the value of a control start operation screen display flag X2 to "1". In this way, the control start operation screen display flag X2 is set to "1" when the control start operation screen 311 is displayed on the display 31, and is set to "0" when the control start button image 411 is touched. Then, the CPU proceeds to step 1335.

In contrast, when the CPU makes negative determination in step 1305 or step 1310, the CPU proceeds to step 1330, and determines whether the value of the control start operation screen display flag X2 is "1".

When the CPU makes affirmative determination in step 1330, the CPU proceeds to step 1335.

When the CPU proceeds to step 1335, the CPU determines whether the control start button image 411 is touched.

When the CPU makes affirmative determination in step 1335, the CPU proceeds to step 1340, and sets the value of the control start operation screen display flag X2 to "0". Subsequently, the CPU proceeds to step 1345, and sets the value of a target setting operation screen display request flag X3 to "1". In this way, the value of the target setting operation screen display request flag X3 is set to "1" when the control start button image 411 is touched, and is set to "0" when the target parking spot 201tgt is set. After that, the CPU proceeds to step 1395, and ends the routine.

In contrast, when the CPU makes negative determination in step 1335, the CPU directly proceeds to step 1395, and ends the routine.

When the CPU makes negative determination in step 1330 as well, the CPU directly proceeds to step 1395, and ends the routine.

Figure 14:
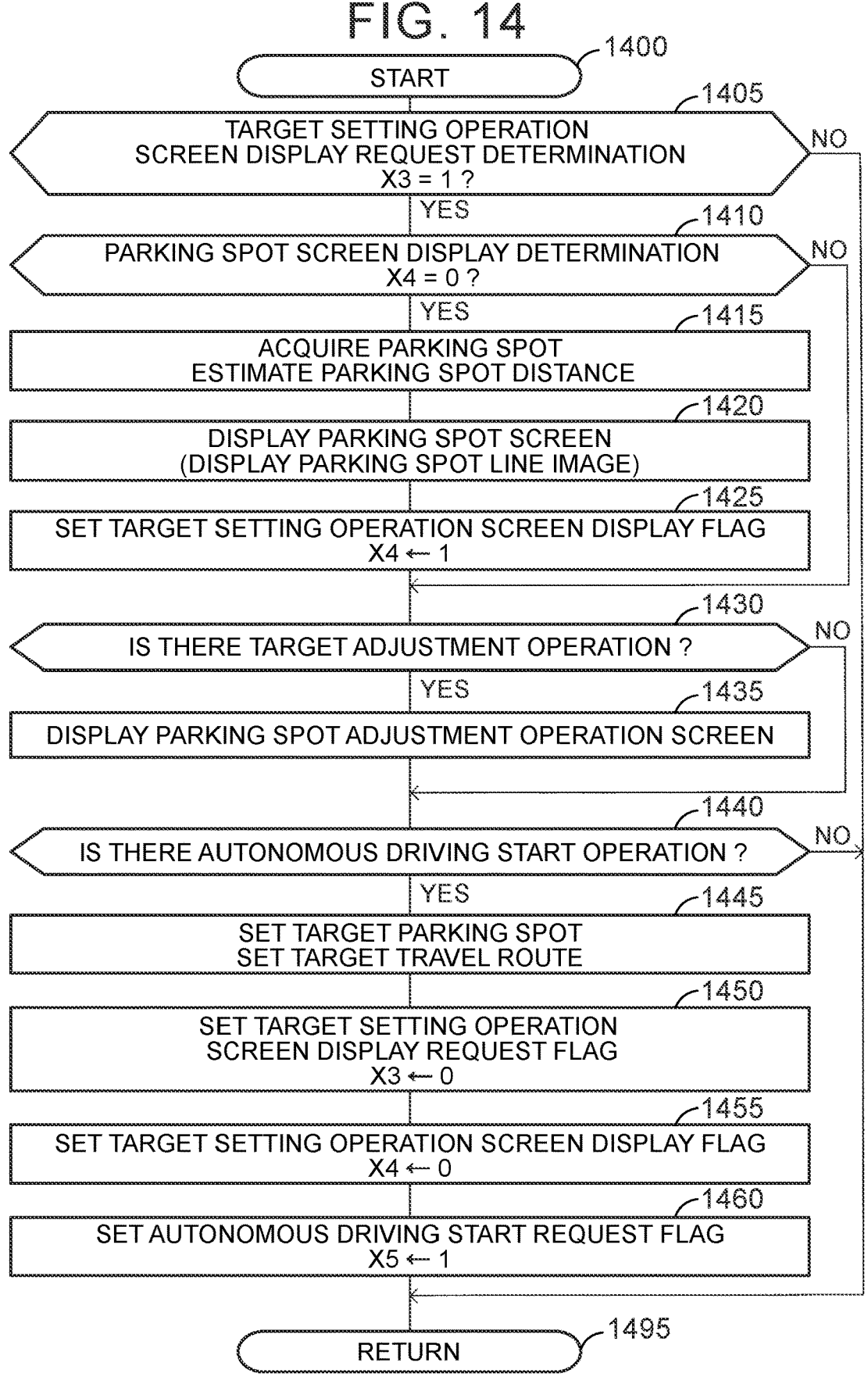
FIG. 14 is a flowchart of a routine that is executed by the park assist system according to the embodiment of the present disclosure.

The CPU is configured to execute the routine shown in FIG. 14 at predetermined computation intervals. Therefore, when predetermined timing comes, the CPU starts a process from step 1400 of FIG. 14, proceeds to step 1405, and determines whether the value of the target setting operation screen display request flag X3 is "1".

When the CPU makes affirmative determination in step 1405, the CPU proceeds to step 1410, and determines whether the value of a target setting operation screen display flag X4 is "0". The value of the target setting operation screen display flag X4 is set to "1" when the target setting operation screen 312 is displayed on the display 31, and is set to "0" when the target parking spot 201tgt is set.

When the CPU makes affirmative determination in step 1410, the CPU proceeds to step 1415. In step 1415, the CPU estimates and acquires a distance to the registered parking spot 201reg as the parking spot distance D201 when the parking lot 200 present beside the host vehicle 100 is the registered parking lot 200reg, or estimates and acquires a distance to the parking spot candidate 201can as the parking spot distance D201 when the parking lot 200 present beside the host vehicle 100 is not the registered parking lot 200reg. Subsequently, the CPU proceeds to step 1420, and causes the display 31 to display the target setting operation screen 312 containing at least the parking spot line image 430. Subsequently, the CPU proceeds to step 1425, and sets the value of the target setting operation screen display flag X4 to "1". After that, the CPU proceeds to step 1430, and determines whether the target adjustment button image 412 is touched.

When the CPU makes affirmative determination in step 1430, the CPU proceeds to step 1435, and causes the display 31 to display the target adjustment operation screen 313. Then, the CPU proceeds to step 1440.

In contrast, when the CPU makes negative determination in step 1430, the CPU directly proceeds to step 1440.

When the CPU proceeds to step 1440, the CPU determines whether the autonomous driving start button image 413 is touched.

When the CPU makes affirmative determination in step 1440, the CPU proceeds to step 1445, and sets the target parking spot 201tgt and also sets the target travel route Rtgt. Subsequently, the CPU proceeds to step 1450, and sets the value of the target setting operation screen display request flag X3 to "0". Subsequently, the CPU proceeds to step 1455, and sets the value of the target setting operation screen display flag X4 to "0". Subsequently, the CPU proceeds to step 1460, and sets the value of an autonomous driving start request flag X5 to "1". In this way, the value of the autonomous driving start request flag X5 is set to "1" when the autonomous driving start button image 413 is touched, and is set to "0" when parking of the host vehicle 100 in the target parking spot 201tgt is done. After that, the CPU proceeds to step 1495, and ends the routine.

In contrast, when the CPU makes negative determination in step 1440, the CPU directly proceeds to step 1495, and ends the routine.

When the CPU makes negative determination in step 1405 as well, the CPU directly proceeds to step 1495, and ends the routine.

Figure 15:
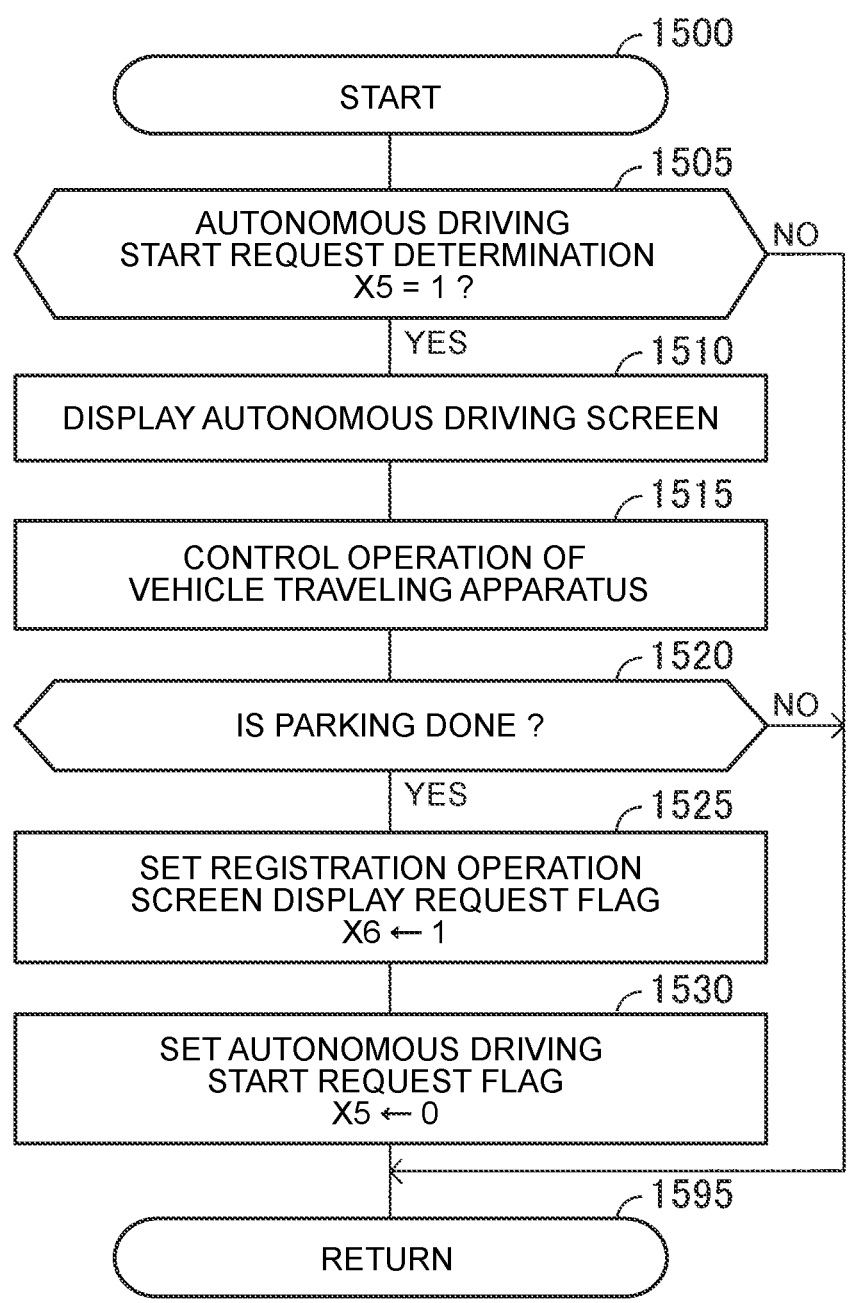
FIG. 15 is a flowchart of a routine that is executed by the park assist system according to the embodiment of the present disclosure.

The CPU is configured to execute the routine shown in FIG. 15 at predetermined computation intervals. Therefore, when predetermined timing comes, the CPU starts a process from step 1500 of FIG. 15, proceeds to step 1505, and determines whether the value of the autonomous driving start request flag X5 is "1".

When the CPU makes affirmative determination in step 1505, the CPU proceeds to step 1510, and causes the display 31 to display the autonomous driving screen 314. Subsequently, the CPU proceeds to step 1515, and controls the operation of the vehicle traveling apparatus 20 such that the host vehicle 100 travels along the target travel route Rtgt. After that, the CPU proceeds to step 1520, and determines whether parking of the host vehicle 100 in the target parking spot 201tgt is done.

When the CPU makes affirmative determination in step 1520, the CPU proceeds to step 1525, and sets the value of a registration operation screen display request flag X6 to "1". In this way, the value of the registration operation screen display request flag X6 is set to "1" when parking of the host vehicle 100 in the target parking spot 201tgt is done, and is set to "0" when information on the parking spot 201 where the host vehicle 100 is parked is registered in the nonvolatile memory. Subsequently, the CPU proceeds to step 1530, and sets the value of the autonomous driving start request flag X5 to "0". After that, the CPU proceeds to step 1595, and ends the routine.

In contrast, when the CPU makes negative determination in step 1520, the CPU directly proceeds to step 1595, and ends the routine.

When the CPU makes negative determination in step 1505 as well, the CPU directly proceeds to step 1595, and ends the routine.

Figure 16:
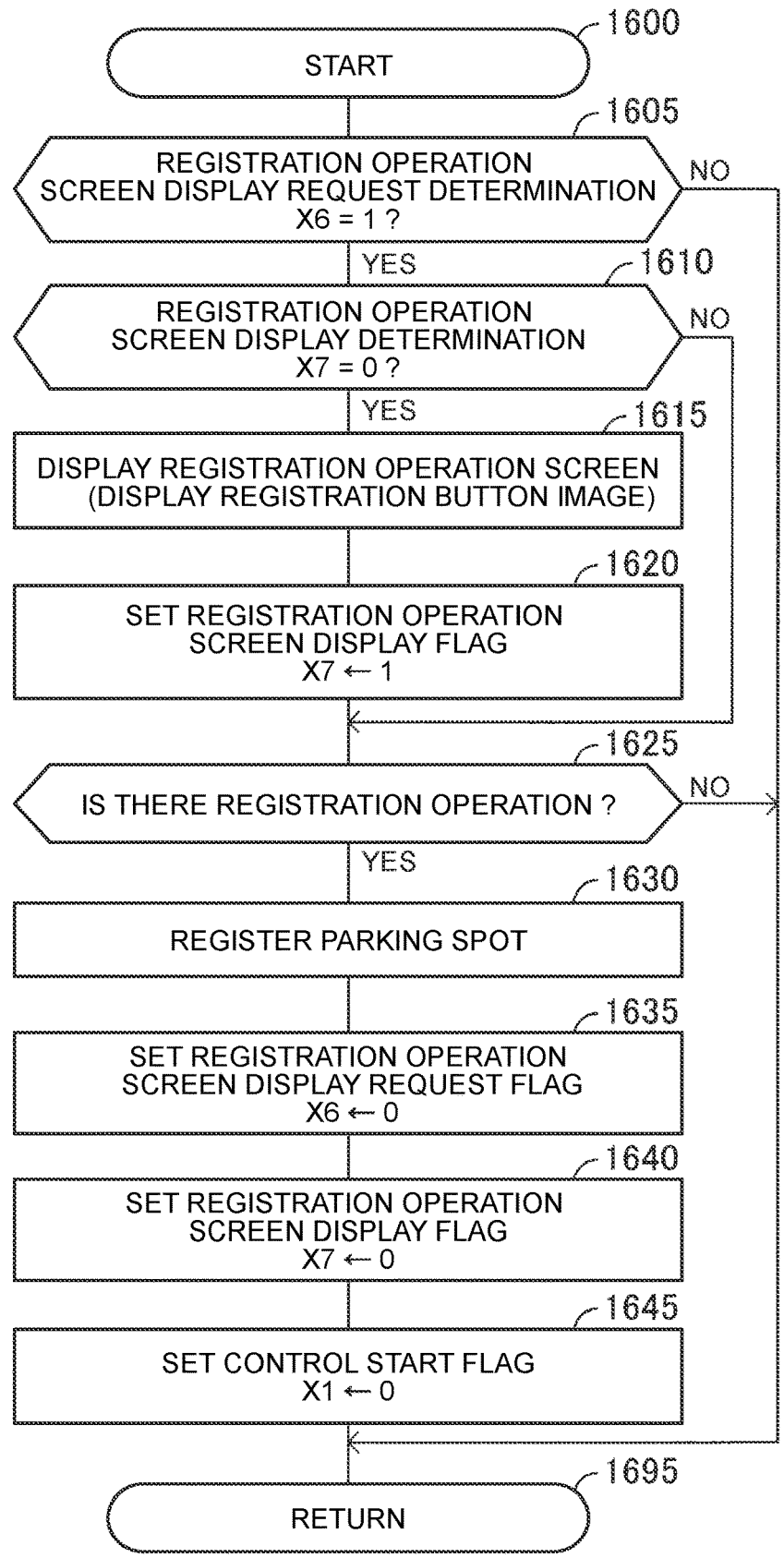
FIG. 16 is a flowchart of a routine that is executed by the park assist system according to the embodiment of the present disclosure.

The CPU is configured to execute the routine shown in FIG. 16 at predetermined computation intervals. Therefore, when predetermined timing comes, the CPU starts a process from step 1600 of FIG. 16, proceeds to step 1605, and determines whether the value of the registration operation screen display request flag X6 is "1".

When the CPU makes affirmative determination in step 1605, the CPU proceeds to step 1610, and determines whether the value of a registration operation screen display flag X7 is "0". In this way, the value of the registration operation screen display flag X7 is set to "1" when the registration operation screen 315 is displayed on the display 31, and is set to "0" when the parking spot 201 where the host vehicle 100 is parked is registered in the nonvolatile memory.

When the CPU makes affirmative determination in step 1610, the CPU proceeds to step 1615, and causes the display 31 to display the registration operation screen 315. Subsequently, the CPU proceeds to step 1620, and sets the value of the registration operation screen display flag X7 to "1". Then, the CPU proceeds to step 1625.

In contrast, when the CPU makes negative determination in step 1610, the CPU directly proceeds to step 1625.

When the CPU proceeds to step 1625, the CPU determines whether the registration button image 414 is touched.

When the CPU makes affirmative determination in step 1625, the CPU proceeds to step 1630, and registers information on the parking spot 201 where the host vehicle 100 is parked in the nonvolatile memory. Subsequently, the CPU proceeds to step 1635, and sets the value of the registration operation screen display request flag X6 to "0". Subsequently, the CPU proceeds to step 1640, and sets the value of the registration operation screen display flag X7 to "0". Subsequently, the CPU proceeds to step 1645, and sets the value of the control start flag X1 to "0". After that, the CPU proceeds to step 1695, and ends the routine.

In contrast, when the CPU makes negative determination in step 1625, the CPU directly proceeds to step 1695, and ends the routine.

When the CPU makes negative determination in step 1605 as well, the CPU directly proceeds to step 1695, and ends the routine.

The specific operation of the park assist system 10 has been described above.

The present disclosure is not limited to the above-described embodiment, and various modifications may be employed within the scope of the present disclosure.

What is claimed is:

1. A park assist system that includes a controller configured to execute park assist control with which a vehicle is automatically parked in a parking spot designated by a driver of the vehicle, the park assist system comprising:
    a display device configured to display a parking spot image such that the driver is able to visually recognize the parking spot image, the parking spot image showing a parking spot in which the vehicle is allowed to be parked with the park assist control, wherein:
    the controller is configured to
        set a point at a position higher than the vehicle and across the vehicle from the parking spot as a viewpoint used to generate the parking spot image,
        set an angle according to a parking spot distance that is an actual distance between the vehicle and a parking spot shown by the parking spot image as a depression angle used to generate the parking spot image,
        generate the parking spot image by using the viewpoint and the depression angle,
        cause the display device to display the generated parking spot image, and
        park the vehicle with the park assist control in a parking spot set by the driver as a target parking spot by way of viewing the parking spot image.

2. The park assist system according to claim 1, wherein the controller is configured to set the depression angle to an angle that increases as the parking spot distance extends.

3. The park assist system according to claim 1, wherein the controller is configured to set the viewpoint to a point at a position farther from the parking spot across the vehicle as the parking spot distance extends.

4. The park assist system according to claim 1, wherein the controller is configured to set the viewpoint to a point at a lower position as the parking spot distance extends.

* * * * *